3,352,637
PROCESS AND APPARATUS FOR THE MANU-
FACTURE OF NITRIDE POWDERS OF THE
ELEMENTS ALUMINUM, BORON, SILICON
OR ZIRCONIUM
Gero Heymer, Knapsack, near Cologne, and Heinz
Harnisch, Lovenich, near Cologne, Germany, assignors to Knapsack Aktiengesellschaft, a corporation of Germany
Filed June 1, 1964, Ser. No. 371,356
Claims priority, application Germany, May 30, 1963,
K 49,863
11 Claims. (Cl. 23—191)

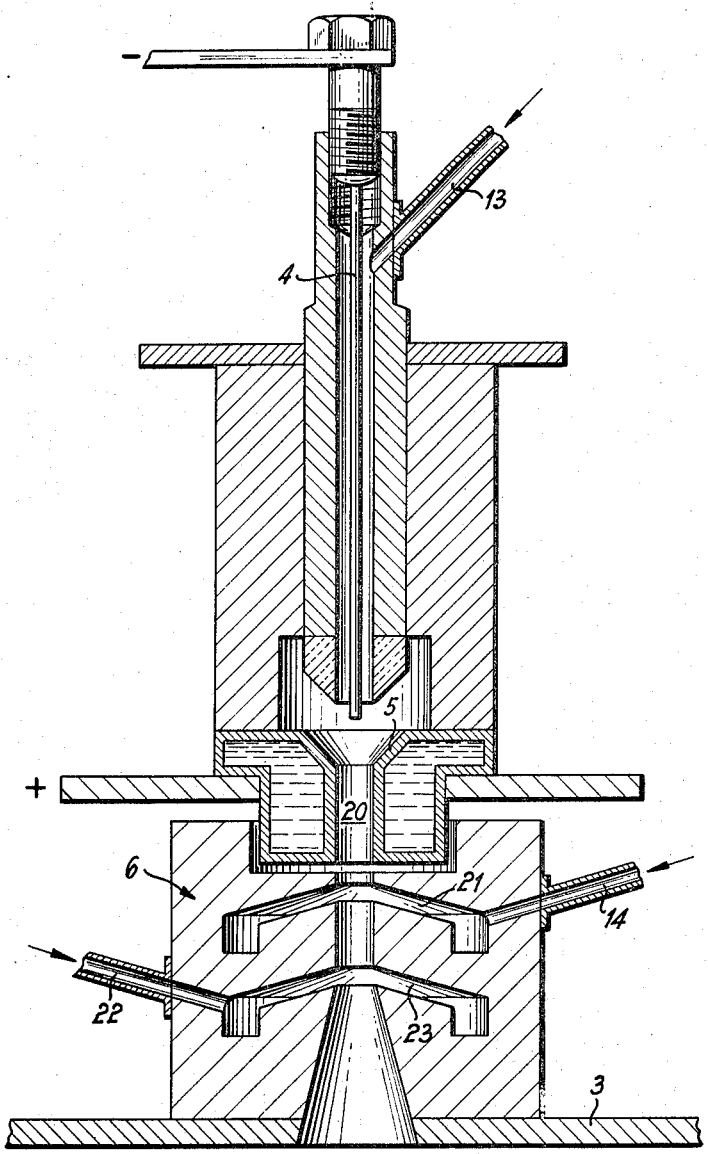

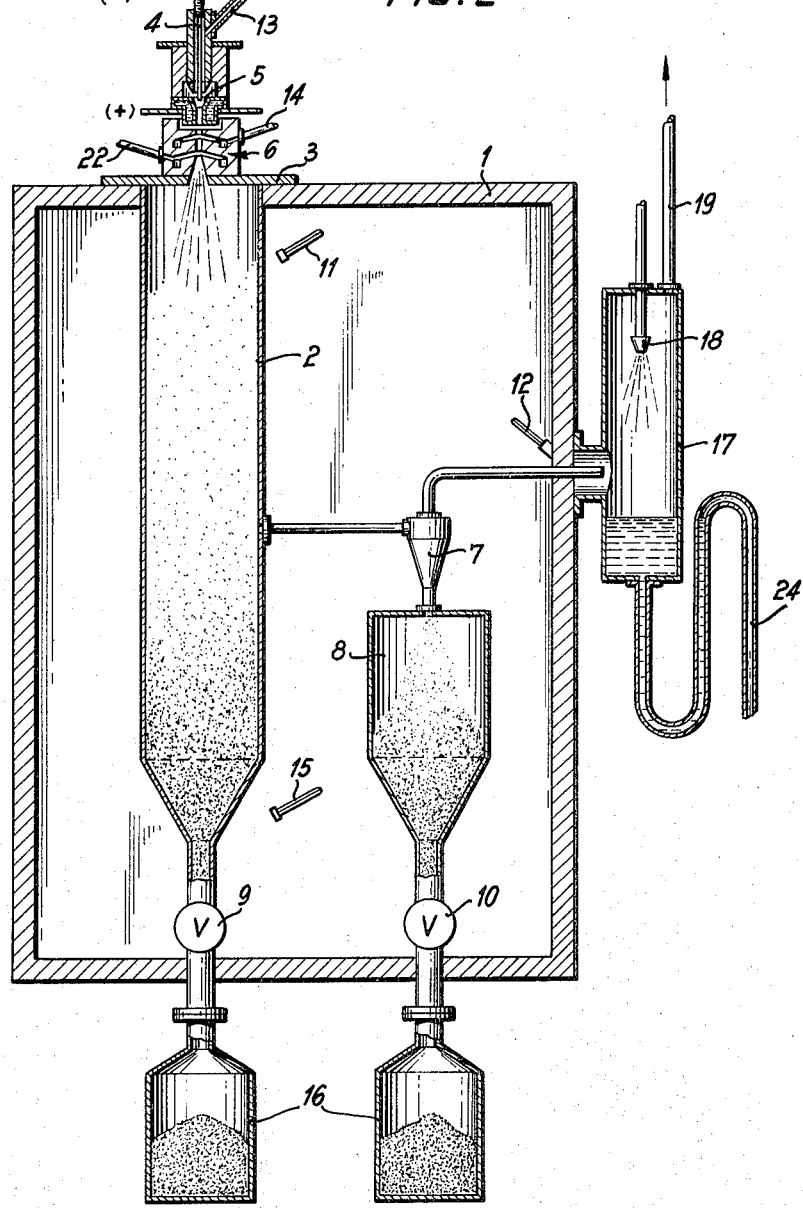

The present invention is concerned with a process for the manufacture of nitride powders of the elements aluminum, boron, silicon or zirconium from corresponding chlorides in the gaseous phase, and with an apparatus suitable for use in carrying out the process of this invention.

It is known that the above nitrides can be made by reacting the above elements in powder form at high temperatures with nitrogen or ammonia. The conventional methods used for making the nitrides, which slightly differ from each other from element to element, have the disadvantage of yielding relatively coarse and often sintered products which are difficult to grind subsequently due to their hardness. Furthermore, in most cases, complete nitration can only be achieved after many hours or even days, which means very high energy expense for small space-time yields in these processes.

It is also known that the above nitrides can be obtained by reacting corresponding halides with anhydrous, liquid or gaseous ammonia at temperatures below about 300° C. so as to obtain amides or imides and transforming the amides or imides at higher temperatures to nitrides. This method is beset with various disadvantages. The amides and imides, for example, are voluminous products. On expelling ammonium chloride or ammonia contained in the amide or imide linkage, they are readily converted into dust form, but sinter together at the high temperatures necessary towards the end of the reaction and, therefore, must be pulverized again.

If the corresponding chlorides and ammonia are reacted with one another from the onset at high temperatures, resulting hydrogen chloride and ammonium chloride, which is obtained when an excess of ammonia is used, will corrode the hot walls of the reaction chamber. All of the conventional processes have the further disadvantage that the degree of purity of the resulting nitrides is impaired by reaction with the material of the vessel during calcination.

The present invention now provides a process which obviates the above mentioned difficulties and wherein a gas pre-heated at very high temperatures, for example hydrogen, nitrogen or argon or a mixture thereof, is introduced in its capacity as a heat transfer agent into a mixing device, whose walls are maintained at a temperature of below about 500° C., preferably at about 200° C., mixed therein with gaseous chlorides and reacted immediately thereafter or concurrently therewith with gaseous ammonia with the resultant formation of nitrides through undetermined intermediate stages according to the general summation equation:

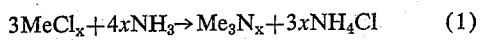
$$3\text{MeCl}_x + 4x\text{NH}_3 \rightarrow \text{Me}_3\text{N}_x + 3x\text{NH}_4\text{Cl} \quad (1)$$

in which Me represents one of the metals aluminum, boron, silicon or zirconium.

The gas or gas mixture used as the heat transfer agent must be pre-heated at temperatures above 2500° C. so as to obtain pure nitride in commercially useful yields. Heating is achieved in an electric arc, since indirect heating at temperatures of 2500° C. and more, for example in a heat exchanger, is technically very difficult to achieve, and would at least entrain considerable difficulties of material due to the permeability to some gases, e.g. hydrogen, of the vessel walls. When e.g. hydrogen or argon is heated in the electric arc at temperatures above 2500° C., the hydrogen will at least partially appear in the atomic state or the argon will appear in a considerably excited state. Conventional arc systems may be used for this.

In order to obtain a good yield and a well crystallized product, the chlorides should be mixed fairly rapidly in the gaseous phase with the hot gases leaving the arc at a high speed, preferably within 1/100 to 1/10,000 second, and the resulting gas mixtures should be reacted with ammonia within the same short period of time.

Alternatively, gaseous chloride and ammonia may be mixed simultaneously with the gas used as the heat transfer agent. In this case, it is unnecessary, however, to introduce the two reactants separately into the reaction chamber, for example through nozzles or slits arranged opposite to each other, since reaction at low temperature would result in the formation of amides or imides which are very voluminous and would thus obstruct the feed lines.

In order to avoid contamination of the resulting nitride by reaction with the material of the vessel, and to avoid corrosion of the walls of the reaction chamber by the mixture of hydrogen chloride, ammonium chloride, etc., it is necessary to maintain the walls of the mixing means at a temperature below about 500° C., preferably at about 200° C.

The process of the present invention offers inter alia the advantage that the ammonia is heated at high temperatures in the particular moment when it enters into reaction with the corresponding chloride. Previous partial decomposition of the ammonia and hence unnecessary high consumption thereof is thus obviated.

All of these objects can be achieved by causing the arc-heated gas to flow through a passageway having e.g. a circular cross-section and by supplying gaseous $\text{SiCl}_4$, $\text{BCl}_3$, $\text{AlCl}_3$ or $\text{ZrCl}_4$ and the ammonia through separate annular slits disposed in said passageway in approximately rectangular or tangential relationship, the feed line for the ammonia being disposed at a level above, opposite to or, according to a preferred embodiment, below the chloride supply inlet opening.

In this context, it is advantageous by appropriately dimensioning the gas outlet channel so to adapt the velocity of flow of the gases leaving the arc that they be at least partially in the atomic or a considerably excited state on being mixed with the chloride, so that a fairly large proportion of the energy absorbed in the arc be transferred to the resulting mixture. This is generally the case at a velocity of flow of above about 100 m./second.

The hot reaction mixture is then cooled advantageously at a temperature slightly above the condensation point of the ammonium chloride formed so that the resultant nitride can be separated from the gas stream with the help of a cyclone, baffle separator, etc. without being impurified by the ammonium chloride. All apparatus parts used for separating the nitride should be kept by an adjustable electric heating means at a temperature of 300 to 380° C., depending on the partial pressure of the ammonium chloride. When the reaction has started, the reaction mixture itself will furnish the bulk of the energy necessary for this despite inevitable losses by dissipation. After separation of the nitride, the gas serving as the energy carrier, for example hydrogen, nitrogen or argon, can be freed from the ammonium chloride by cooling or scrubbing with water; the gas may then be dried and returned to the arc, so that it can be cycled substantially without any loss thereof.

In order to prepare pure nitride, it is necessary to use starting substances which are free from oxygen and steam, and to carry out the process with the exclusion of the outside atmosphere until the nitride has been separated, since the hot reaction mixture would already react with traces of oxygen or steam.

The amount of heating gas passed through the arc depends on the amount of chloride and energy supplied, which can be caused to accumulate in the heating gas with the aid of the respective heating means. The ratio of these factors to each other should be adapted with the proviso that the reaction mixture—while bearing in mind the loss of heat through the cooled walls of the mixing means—has a temperature high enough for the formation of pure nitride. Thus, for example, about 4 normal cubic meters (N.T.P.) hydrogen/hour are required for a 20 kilowatt arc burner and for the supply of 3.8 kg. $SiCl_4$/hr. and the necessary stoichiometric amount of 2.6 cubic meters (N.T.P.) $NH_3$/hour.

The process of the present invention can also be carried out using the ammonia in a deficiency with respect to Equation 1 above so that a portion of the ammonium chloride formed in accordance with Equation 1 is replaced with an equivalent proportion of hydrogen chloride. This mode of executing the present process has the advantage that less ammonia is consumed and that higher temperatures can be obtained in the reaction mixture for the same efficiency of the arc burner. For reaction-kinetic reasons, the ammonia should be used in such a proportion that at least 5%, preferably more than 40%, of the hydrogen chloride formed in accordance with the following equation:

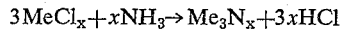

$$3MeCl_x + xNH_3 \rightarrow Me_3N_x + 3xHCl$$

be transformed into ammonium chloride.

The space/time yield is greater than 1 kg. nitride/liter/hour and the reaction product is obtained in fine powder form. The reaction products are most advantageously collected in a container under inert gas, and cooled. The gases flowing off include finely divided reaction product in suspension, which is removed from the off-gas by dry gas purification. This may be done, e.g. by means of a cyclone, baffle separator or calming vessel.

The nitrides obtained by the process of the present invention are distinguished by their high purity and substantially stoichiometric composition.

Depending on the intended use, the products can be prepared by varying the reaction temperature and time in the form of X-ray crystalline or amorphous powder.

They are always obtained in finely divided form. This is a very important property especially when the nitrides are intended for making shaped articles therefrom by compression followed by sintering, or when the powder is used as an additive in dyes, enamels or high polymers. Also when used as a grinding agent, the above property may turn out useful.

The bulk density of the powders can be increased by conventional compacting methods by more than a power of ten.

An apparatus suitable for use in carrying out the process of this invention is shown diagrammatically in section in the accompanying drawings in which FIG. 1 is a longitudinal section through an apparatus for producing an electric arc and a mixing means, in which the gases heated in the arc transmit energy to gaseous chlorides which then react with ammonia;

FIG. 2 represents a heated apparatus, wherein the resulting pulverulent nitrides are removed from the gas stream, and the heated gas is ultimately freed from the ammonium chloride formed; other apparatuses may also be employed.

More particularly, the process of the present invention comprises causing the gas (e.g. hydrogen, nitrogen or argon) serving as the heat transfer agent and introduced into the arc through socket 13 as shown, for example, in FIGS. 1 and 2, to pass through the arc burning between cathode 4 and anode 5 which may be cooled, and thereby heating it at temperatures of preferably above 2500° C. In channel 20 of mixing means 6, the preheated heat carrier is admixed with gaseous chloride supplied through line 14 and annular slit 21.

Gaseous ammonia is supplied through line 22 and slit 23, mixed with the flowing gas mixture and reacted therewith according to the equation indicated above.

Care should be taken that the chloride and ammonia supply inlets into the channel are arranged opposite to one another or spaced from one another so as to maintain the gas mixture at a temperature of at least 1500° C. after the reaction so as to ensure that the reaction proceeds according to Equation 1 without being arrested at an intermediate stage.

The ratio of ammonia to chloride on the one hand and to the gas serving as the heat transfer agent on the other should be selected in such a way that the temperature achieved in the final reaction mixture which is a function of the energy transferable to the heat transfer agent in the arc is sufficiently high to transform all chloride in accordance with Equation 1 into nitride without any intermediate stage, for example the nitride stage, being retained.

The resulting pulverulent nitrides flow together with the gas stream consisting of argon, nitrogen and/or hydrogen and gaseous ammonium chloride through a down pipe 2, become gradually cooled, and deposit to a major portion in loose powder form in the bottom portion of said down pipe 2, whereas the gas stream is caused to flow through a cyclone 7 and thereby freed from nitride powder in suspension and ultimately introduced into a scrubbing tower 17, in which the ammonium chloride is scrubbed out by means of a water spray nozzle 18 and withdrawn in the form of an aqueous solution through siphon 24, whilst off-gas is discharged from the apparatus through pipe 19. Down pipe 2, cyclone 7 with the allotted collecting vessel 8 and valves 9 and 10 operated from the outside are preferably disposed in a heat insulated, e.g. lined casing 1 provided with an internal electric heating means and with several measuring means, e.g. thermoelements 11, 12 and 15 which permit regulating the temperature of casing 1 in such a manner that ammonium chloride cannot condense. By opening valves 9 and 10, a relatively large portion of nitride can be removed from time to time and emptied into containers 16. Casing 1 communicates wth mixing means 6 through a plate 3 having a recess groove.

Obviously, the reaction products can be separated from one another by other means. More especially, the ammonium chloride may be condensed until dry and thus recovered as a by-product, or it may be condensed together with the nitride in the absence of any heated separating means and ultimately removed from the nitride.

The process of the present invention for making nitrides of the elements aluminum, boron, silicon or zirconium comprises more especially rapidly mixing concurrently or successively, in a mixing zone, whose walls are maintained at a maximum temperature of about 500° C., preferably at about 200° C., a gas serving as a heat transfer agent and heated in an electric arc at a minimum temperature of about 2500° C., with at least one gaseous chloride of the above elements and with gaseous ammonia used as the starting components so as to obtain a resulting mixture having a minimum temperature of about 1500° C., cooling the resulting reaction products, collecting the said reaction products, and isolating nitride therefrom.

The gas used as the heat transfer agent includes hydrogen, nitrogen, argon or a mixture thereof, and the reaction components are rapidly and intimately mixed with one another within a period of time of about $\frac{1}{100}$ to $\frac{1}{10,000}$ second. The gas heated in the arc is caused to leave the arc at a velocity of flow of at least about 100 m./second. The ammonia is used in a proportion such that at least about 5%, preferably more than 40%, of the hydrogen chloride evolved in accordance with the reaction equation:

$$3MeCl_x + xNH_3 \rightarrow Me_3N_x + 3xHCl$$

be transformed to ammonium chloride. The reaction products are then cooled at a temperature below the condensation point of ammonium chloride. The starting components should be free from oxygen and steam.

The apparatus used for carrying out the process of the present invention comprises an arc arrangement consisting of a cathode 4, an anode 5, a gas supply socket 13 and a series connected mixing nozzle 6 having allotted feed lines 14 and 22 for supplying starting product through allotted annular slits 21 and 23 opening into a central passageway 20, the mixing nozzle being preferably disposed below the said arc; a heat insulated casing 1 having an allotted down-pipe 2 with an allotted lower valve 9, the heat insulated casing being connected in series relationship to the mixing nozzle and the down-pipe being disposed below the mixing nozzle outlet; a cyclone 7 having an allotted collecting means 8 with an allotted lower valve 10, and thermoelements 11, 12 and 15; the said cyclone 7, collecting means 8 with the allotted valve 10 and the said thermoelements 11, 12 and 15 being disposed inside the said casing 1; a further collecting means 16 communicating with valves 9 and 10; a gas wash tower 17 communicating with cyclone 7; a spray nozzle 18 and an off-gas pipe 19 disposed at the head portion of the said gas wash tower; and a siphon 24 into which the lower end portion of the gas wash tower projects. The annular slits 21 and 23 are preferably arranged in semicircular fashion and opposite to one another. Casing 1 communicates with mixing nozzle 6 through a plate 3 provided with a recessed groove.

The following examples serve to illustrate the invention without limiting it thereto.

*Example 1*

9.9 kg. SiCl$_4$ were evaporated at the rate of 3.3 kg. SiCl$_4$ per hour and forced under a pressure of 1.4 atmospheres to flow through an annular slit into a channel having a circular cross-sectional area, in which the SiCl$_4$ in vapor form was mixed with 4 cubic meters (N.T.P.) hydrogen per hour, which had previously been passed through an electric arc burner of 20 kw. The mixture so produced was caused to react immediately thereafter with 1.15 cubic meters (N.T.P.) ammonia per hour according to the summation equation:

$$3SiCl_4 + 8NH_3 \rightarrow Si_3N_4 + 4NH_4Cl + 8HCl \qquad (2)$$

The temperature amounted to about 2600° C. Approximately 45% of the energy supplied to the hydrogen was transmitted before or during the reaction to the cooling liquids of the anode and the mixing means. The temperature of the mixing means was maintained at 250° C. by means of an oil cycle.

2.64 kg. of a finely divided loose powder were obtained. Analytical composition and X-ray photographic investigation indicated that the powder consisted of pure Si$_3$N$_4$, i.e. to the extent of approximately 80% of α- and to the extent of 20% of β-Si$_3$N$_4$. This corresponded to a yield of 97% Si$_3$N$_4$. Residual silicon could be detected in the water of the scrubbing tower. The product had a bulk density of 15 g./liter and could be compacted by simple means to have a bulk density of 110 g./liter.

*Example 2*

In a manner analogous to the SiCl$_4$ of Example 1, 3.0 kg. gaseous BCl$_3$ were mixed within 1 hour with 4 cubic meters (N.T.P.) nitrogen heated in the arc and reacted immediately thereafter at a temperature of 2800° C. with 1.68 cubic meters (N.T.P.) ammonia in accordance with the summation equation:

$$BCl_3 + 3NH_3 \rightarrow BN + 2NH_4Cl + HCl \qquad (3)$$

The arc was operated at a wattage of 22 kw. About 40% of the energy supplied to the argon was delivered to the cooling media of the anode and the mixing means. The temperature of the mixing means was maintained at 300° C. by cooling with nitrogen.

604 grams of a loose, finely divided powder were collected with the help of the separating means. 14 grams boron were detected in the water of the scrubbing tower. The powder obtained was partially X-ray amorphous; its crystalline proportion had the structure of hexagonal boron nitride. Its analytical composition corresponded to the formula BN. The boron nitride was obtained in an amount corresponding to a yield of 95%, calculated on the BCl$_3$ used as feed.

*Example 3*

3.5 kg. aluminum chloride were evaporated under pressure at 220° C. The resulting vapor was released through a needle valve and conveyed within one hour through an oil-heated passageway and a semicircular slit into a channel, in which it was mixed with 4.5 cubic meters (N.T.P.) hydrogen heated in an arc of 18 kw./hr. and simultaneously with 2.35 cubic meters (N.T.P.) ammonia, the ammonia being supplied through a semicircular slit disposed opposite the first semicircular slit.

The aluminum chloride and ammonia reacted with one another at a temperature of about 2500° C. according to the fololwing equation:

$$AlCl_3 + 4NH_3 \rightarrow AlN + 3NH_4Cl \qquad (4)$$

The mixing means and the aluminum chloride supply pipe were maintained at a temperature of 250° C. by means of a joint oil cycle.

1.05 kg. of a light, fine powdered substance were obtained which after analytical and X-ray photographic investigation was found to represent X-ray crystalline AlN having a Wurtzit lattice. The yield of AlN, calculated on the aluminum chloride feed, was 97.5%.

We claim:

1. In a process for the manufacture of a nitride of at least one element selected from the group consisting of aluminum, boron, silicon, and zirconium by reacting a gaseous chloride of the said element and gaseous ammonia in contact with a further gas at high temperatures, the improvement which comprises heating a gas serving as a heat transfer agent in an electric arc at a temperature of at least 2500° C., rapidly mixing said heated gas with the aforesaid chloride and ammonia in a mixing zone whose walls are maintained at a temperature of at most 500° C. so as to avoid corrosion of the walls of the reaction chamber, the resulting mixture having a minimum temperature of about 1500° C., cooling the resulting reaction products, collecting said reaction products, and isolating the nitride therefrom in loose powdered form.

2. The process of claim 1 wherein the gas serving as the heat transfer agent is a member selected from the group consisting of hydrogen, nitrogen and argon.

3. The process of claim 1 wherein the walls of the mixing zone are maintained at a temperature of about 200° C.

4. The process of claim 1 wherein the gas used as heat transfer agent is mixed simultaneously with the gaseous chloride and ammonia.

5. The process of claim 1 wherein the gas used as the heat transfer agent is mixed successively with the gaseous chloride and ammonia.

6. The process of claim 1 wherein rapid and intimate mixing of the individual components is achieved within about 1/100 to 1/10,000 second.

7. The process of claim 1 wherein the gas heated in the electric arc is caused to leave the electric arc at a velocity of flow of at least about 100 m./second.

8. The process of claim 1 wherein the ammonia is used in a proportion so as to transform at least about 5% of the hydrogen chloride evolved according to the reaction equation:

$$3MeCl_x + xNH_3 \rightarrow Me_3N_x + 3xHCl$$

to ammonium chloride.

9. The process of claim 8, wherein at least 40% of the hydrogen chloride is transformed to ammonium chloride.

10. The process of claim 1 wherein the reaction products are cooled at temperatures below the condensation point of ammonium chloride.

11. The process of claim 1 wherein the starting components are free from oxygen and steam.

References Cited

UNITED STATES PATENTS 3,152,006  10/1964  Basche _____ 23—191
3,226,194  12/1965  Kuntz _____ 23—192

OSCAR R. VERTIZ, *Primary Examiner.*

J. J. BROWN, H. S. MILLER, *Assistant Examiners.*